(12) United States Patent
Wei et al.

(10) Patent No.: US 6,968,290 B2
(45) Date of Patent: Nov. 22, 2005

(54) ELECTROCHEMICAL MACHINING TOOL ASSEMBLY AND METHOD OF MONITORING ELECTROCHEMICAL MACHINING

(75) Inventors: Bin Wei, Mechanicville, NY (US); Wei Li, Bothell, WA (US); Michael Scott Lamphere, Hooksett, NH (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/818,874

(22) Filed: Mar. 27, 2001

(65) Prior Publication Data

US 2002/0143492 A1 Oct. 3, 2002

(51) Int. Cl.[7] ............................................. G01B 5/02
(52) U.S. Cl. ....................................................... 702/171
(58) Field of Search ........................ 702/171; 205/645, 205/641, 711; 352/12; 239/8; 330/52; 137/227; 29/890; 219/130; 136/64; 15/56; 134/8; 13/56

(56) References Cited

U.S. PATENT DOCUMENTS

| 3,774,999 A | * | 11/1973 | Ivestor ........................ 352/12 |
| 5,109,562 A | * | 5/1992 | Albrecht ........................ 15/56 |
| 5,113,358 A | * | 5/1992 | Reber ........................... 702/171 |
| 5,672,263 A | * | 9/1997 | Raulerson et al. ............ 205/641 |
| 6,352,209 B1 | * | 3/2002 | Skeath et al. .................. 239/8 |
| 6,355,156 B1 | * | 3/2002 | Li et al. ...................... 205/645 |

* cited by examiner

Primary Examiner—Bryan Bui
Assistant Examiner—Tung S. Lau
(74) Attorney, Agent, or Firm—Penny A. Clarke; Patrick K. Patnode

(57) ABSTRACT

An electrochemical machining tool assembly includes first and second tools that are spaced apart from one another so that a workpiece can be located therebetween. The assembly also includes a first ultrasonic transducer mounted in the first tool and a second ultrasonic transducer mounted in the second tool. The electrochemical machining process is monitored by generating ultrasonic waves with the first and second ultrasonic transducers, and then detecting the arrival times, at the first and second ultrasonic transducers, of certain reflections of the ultrasonic waves. The detected arrival times are then used to calculate parameters such as the gap sizes between the first and second tools and a workpiece situated therebetween and the thickness of the workpiece.

16 Claims, 2 Drawing Sheets

ELECTROCHEMICAL MACHINING TOOL ASSEMBLY AND METHOD OF MONITORING ELECTROCHEMICAL MACHINING

BACKGROUND OF THE INVENTION

This invention relates generally to electrochemical machining and more particularly to monitoring gap sizes and workpiece thicknesses during electrochemical machining operations.

Electrochemical machining (ECM) is a commonly used method of machining electrically conductive workpieces with one or more electrically conductive tools. During machining, a tool is located relative to the workpiece such that a gap is defined therebetween. The gap is filled with a pressurized, flowing, aqueous electrolyte such as sodium nitrate. A direct current electrical potential is established between the tool and the workpiece to cause controlled deplating of the electrically conductive workpiece. The deplating action takes place in an electrolytic cell formed by the negatively charged electrode (cathode) and the positively charged workpiece (anode) separated by the flowing electrolyte. The deplated material is removed from the gap by the flowing electrolyte, which also removes heat formed by the chemical reaction. The anodic workpiece generally assumes a contour that matches that of the cathodic tool.

For a given tooling geometry, dimensional accuracy of the workpiece is primarily determined by the gap distribution. The gap size should be maintained at a proper range. Too small a gap (such as less than 100 micrometers in a standard ECM operation) could lead to arcing or short-circuiting between the tool and the workpiece. Too large a gap could lead to non-uniform machining as well as a reduction in machining rate. Monitoring and controlling the gap size between the tool and the workpiece is thus important for ECM tolerance control. In addition, in process measurement of workpiece dimensions is important in many operations. For example, in machining a rotor blade for a gas turbine engine, the blade thickness should be directly measured during machining so that the desired blade thickness is obtained.

Lack of suitable means for sensing gap sizes and workpiece dimensions may hinder ECM accuracy control. Without such means, many rounds of costly trial-and-error experiments must be run to obtain the gap size changes that occur during the machining process. Gap size can change significantly during the machining process, partly because the conductivity of the electrolyte may change in the gap due to Joule heating or gas bubble generation on the tool surface. Variation and inaccuracy in tool feed rate and tool positioning can also contribute to changes in gap size and workpiece thickness. In process detection of gap sizes and workpiece dimensions is thus needed to improve ECM process control.

Several types of ECM sensors have been developed over the years. An ECM control method using ultrasonic sensors is described in U.S. Pat. No. 5,672,263 issued Sep. 30, 1997 to David A. Raulerson et al. This control method is used in connection with electrochemical machining of large cylindrical workpieces, where a machining head is located outside of the workpiece for machining its outer surface. One or more ultrasonic sensors are located within the cylindrical workpiece for monitoring workpiece wall thickness during the machining operation. Movement of the ultrasonic sensors relative to the workpiece results in significant signal noise and inaccuracy because of local workpiece metallurgical inhomogeneity. Furthermore, the Raulerson et al approach is limited to workpieces having a large, inner opening for containing the sensors and storing the fluid through which the ultrasonic waves propagate. By way of example, the Raulerson et al approach cannot be used while electrochemical machining small, compact workpieces, such as rotor blades used in gas turbine engines, because ultrasonic sensors cannot be placed inside such workpieces. In addition, Raulerson et al does not measure gap size. It is intended to only measure a workpiece wall thickness near a wide open space.

Recently, an approach to in-situ measurement of gap size and workpiece thickness has been proposed for ECM process control. In this approach, a single ultrasonic sensor is embedded in the ECM tool, and the gap size and workpiece thickness are obtained from ultrasonic time-of-flight measurements. The sensor generates an ultrasonic wave that propagates through the tooling, through the electrolyte in the gap and then through the workpiece. The sensor will receive reflections from the surface of the tool, the front side of the workpiece, and the back side of the workpiece. By comparing the time at which each of these reflected signals is received, the gap size and workpiece thickness can be determined.

In most situations, this approach works quite well. However, with some workpiece materials, material impedance mismatches between the tool, solution and workpiece can be extremely large. Due to such large impedance mismatches, and signal attenuation in the materials, the ultrasonic signals transmitted through the workpiece and then reflected from the back side of the workpiece can become extremely small and difficult to detect. Furthermore, due to the inhomogeneity of some workpiece materials, the acoustic velocity of these materials could vary from location to location, thereby reducing the accuracy of the thickness measurements. Accordingly, it would be desirable to have an approach for the in-situ measurement of gap size and workpiece thickness that is independent of workpiece material.

BRIEF SUMMARY OF THE INVENTION

The above-mentioned need is met by the present invention, which provides an ECM tool assembly having first and second tools spaced apart from one another so that a workpiece can be located therebetween. The assembly also includes a first ultrasonic transducer mounted in the first tool and a second ultrasonic transducer mounted in the second tool. The ECM process is monitored by generating ultrasonic waves with the first and second ultrasonic transducers, and then detecting the arrival times, at the first and second ultrasonic transducers, of certain reflections of the ultrasonic waves. The detected arrival times are then used to calculate parameters such as the gap sizes between the first and second tools and a workpiece situated therebetween and the thickness of the workpiece.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
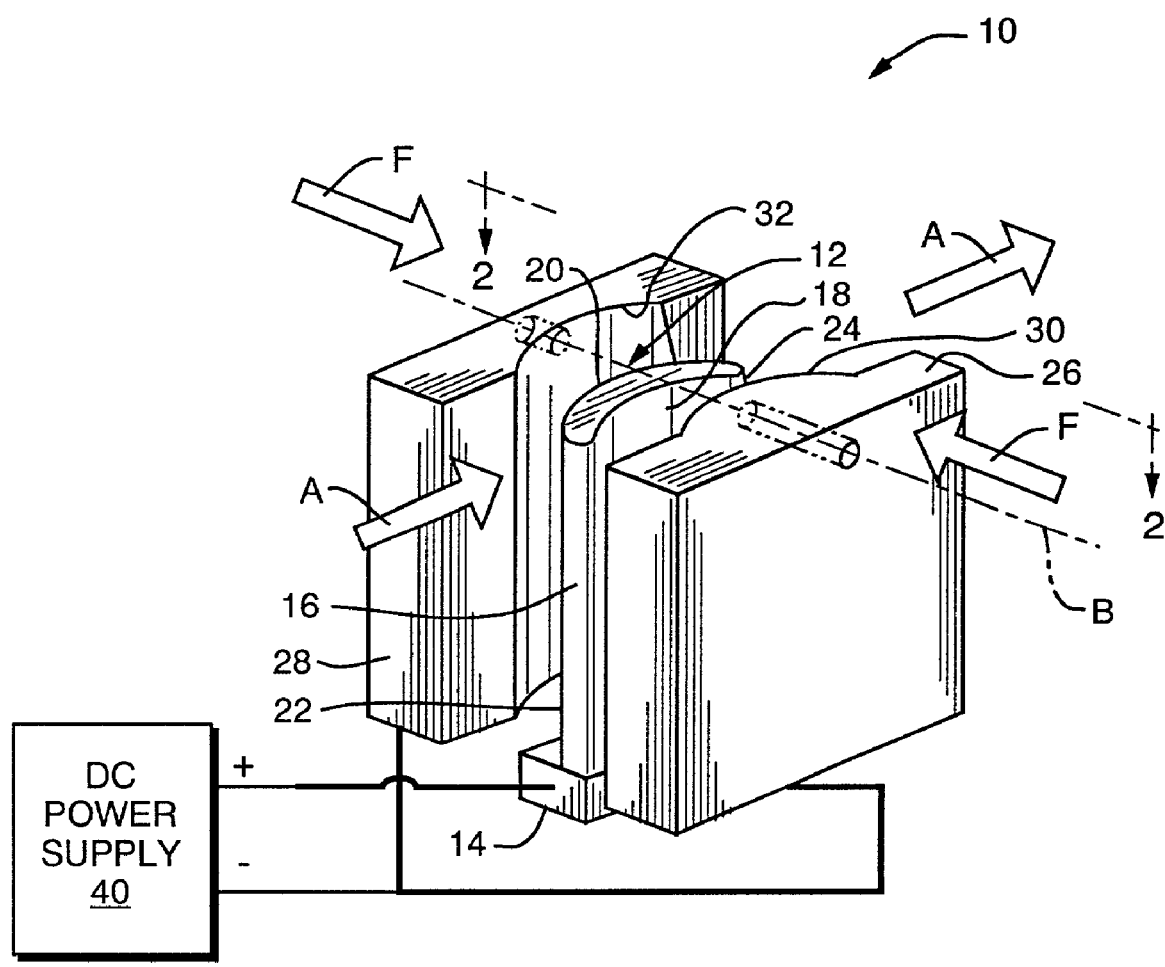
FIG. 1 is a perspective view of an electrochemical machining tool assembly having means for in-situ measurement of gap size and workpiece thickness.
Figure 2:
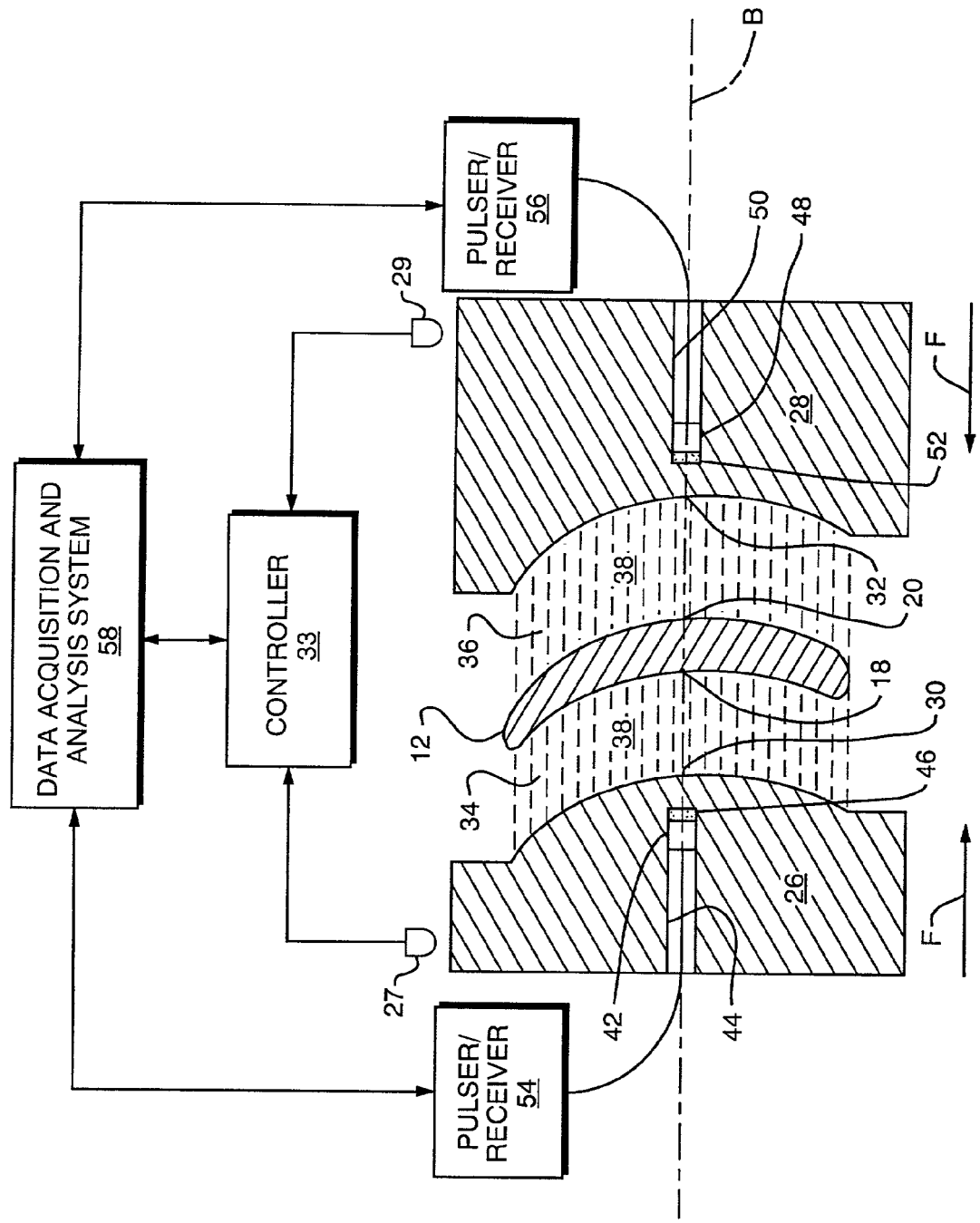
FIG. 2 is a sectional view of the electrochemical machining tool assembly taken along line 2—2 of FIG. 1.

Referring to the drawings wherein identical reference numerals denote the same elements throughout the various views, FIGS. 1 and 2 show an electrochemical machining (ECM) tool assembly 10 used for machining a workpiece 12. As shown in the Figures, the workpiece 12 is a rotor blade of the type used in a gas turbine engine (such as a compressor blade or a turbine blade). The rotor blade 12 includes a shank portion 14 for mounting the blade to a rotor disk and an airfoil 16 that either adds work (in the case of a compressor blade) to or extracts work (in the case of a turbine blade) from the gas flow within the gas turbine engine. The airfoil 16 has a concave pressure side 18 and a convex suction side 20 joined together at a leading edge 22 and a trailing edge 24. The airfoil 16 extends chordwise from the leading edge 22 to the trailing edge 24 and spanwise from the shank portion 12 to its outer tip. It should be noted that a rotor blade workpiece is used here only as one example to facilitate description of the present invention. The present invention is also applicable to other types of workpieces.

The ECM tool assembly 10 includes first and second tools 26 and 28 arranged on opposite sides of the workpiece 12. Each tool 26, 28 has a suitable configuration to electrochemically machine the workpiece 12 into the desired shape. The first tool 26 has a convex cutting surface 30 formed therein and facing toward the workpiece 12 for machining the concave side 18 thereof. The second tool 28 has a concave cutting surface 32 formed thereon and facing toward the workpiece 12 for machining the convex side 20 thereof. The two tools 26, 28 are mounted on opposite sides of the workpiece 12 so as to be movable toward the workpiece 12 as indicated by arrows F. (The tools 26, 28 can also move in the directions opposite the arrows F for retraction away from the workpiece 12.) Movement of the tools 26, 28 is accomplished by any suitable means (not shown), many of which are well known in the art, under the control of a motion controller 33. The controller 33 is programmed to control the advancement and feed rate of the tools 26, 28. A first position sensor 27 is associated with the first tool 26, and a second position sensor 29 is associated with the second tool 28. The position sensors 27, 29, which can be any suitable device, provide tool position feedback data. The feedback data can be fed to the controller 33 as shown in FIG. 2. Alternatively, the feedback data can be displayed on a readout for use by the operator of the ECM tool assembly 10.

During operation, the tools 26, 28 are positioned in a desired spatial relationship with respect to the workpiece 12. Specifically, the first tool 26 is positioned relative to the workpiece 12 so as to define a first gap 34 between the first cutting surface 30 and the concave side 18 of the workpiece 12. The second tool 28 is positioned so as to define a second gap 36 between the second cutting surface 32 and the convex side 20 of the workpiece 12.

The first and second tools 26, 28 and workpiece 12 are disposed in a receptacle (not shown) filled with an electrolytic fluid 38 such that the gaps 34, 36 are filled with the electrolytic fluid 38 as shown in FIG. 2. Suitable known means, such as a pump system (not shown), are provided for circulating the electrolytic fluid 38 such that it flows through the gaps 34, 36 in the direction of the arrows A shown in FIG. 1. It should be noted that the fluid flow direction represented by arrows A is only one possible direction. The electrolytic fluid can flow in many other directions including spanwise from shank-to-tip or from tip-to-shank.

The ECM tool assembly 10 further includes a DC power supply 40. Both tools 26, 28 are connected to the negative terminal of the DC power supply 40 so as to function as cathodes, and the workpiece 12 is connected to the positive terminal of the DC power supply 40 so as to function as an anode. Thus, a DC electrical potential will be established between the workpiece concave side 18 and the first cutting surface 30 and between the workpiece convex side 20 and the second cutting surface 32. This will cause controlled deplating of the workpiece sides 18, 20 so as to machine the workpiece 12 to its desired shape. The flow of electrolytic fluid 38 through the gaps 34, 36 will remove the deplated material and prevent it from being deposited on the tools 26, 28.

A first ultrasonic transducer 42 is embedded or mounted in a cavity 44 formed in the back side of the first tool 26 so as to be directly behind the first cutting surface 30. An acoustic couplant 46, such as a gel or oil, is applied between the transducer 42 and the tool 26 for assisting sound emitted from the transducer 42 to penetrate the tool material. A second ultrasonic transducer 48 is similarly embedded or mounted in a cavity 50 formed in the back side of the second tool 28 so as to be directly behind the second cutting surface 32. An acoustic couplant 52 is applied between the second transducer 48 and the second tool 28.

Both ultrasonic transducers 42, 48 are capable of generating and sensing ultrasonic waves that are used to measure gap size and workpiece thickness. The transducers 42, 48 can be any suitable type, such as contact or immersion transducers. Oil is preferably used as the acoustic couplant 46, 52 if contact transducers are used. Oil having a low viscosity is used for measurements through smooth surfaces, while oil having a higher viscosity is used for measurements through rough surfaces. An aqueous couplant is used with immersion transducers.

Preferably, but not necessarily, the ultrasonic transducers 42, 48 are both located on an axis B that extends normal to both the first and second cutting surfaces 30, 32. The transducer axis B is also preferably either parallel to, or at a small angle to, the tool feed direction represented by arrow F. This arrangement facilitates using ultrasonic time-of-flight (TOF) measurements to calculate the gap sizes and workpiece thickness, as will be described below. Although the transducer pair 42, 48 can be mounted at any location on the first and second tools 26, 28, they are generally placed in a location where it is most useful to closely monitor and control the gap sizes and workpiece thickness. It is also within the scope of the present invention to provide multiple pairs of such transducers at various locations in the first and second tools 26, 28.

The first and second ultrasonic transducers 42, 48 are each connected to a corresponding pulser/receiver 54, 56, respectively. Each pulser/receiver 54, 56 transmits electrical energy to its associated transducer, causing the transducer to emit ultrasonic energy. Each pulser/receiver 54, 56 also receives the electrical signal generated by its associated transducer when the transducer senses a reflected ultrasonic pulse. The pulser/receivers 54, 56 are both connected to a data acquisition and analysis system 58, which controls the operation of the transducers 42, 48 and makes the necessary calculations for determining the gap width and workpiece thickness measurements.

In operation, the ECM tool assembly 10 uses ultrasonic TOF measurements for gap sizing and workpiece thickness evaluation. The first ultrasonic transducer 42 mounted in the first tool 26 generates an ultrasonic wave that propagates through the acoustic couplant 46 and into the tool material. Part of the ultrasonic wave transmitted through the first tool 26 is reflected by the interface between the first cutting surface 30 and the electrolytic fluid 38. The reflected portion of the wave returns to the transducer 42 (which now functions as a receiver) with an arrival time $t_{a1}$, while the other part of the ultrasonic wave is transmitted through the electrolytic fluid 38. This portion of the wave is reflected by the interface between the workpiece concave side 18 and the electrolytic fluid 38 and returns to the transducer 42 with an arrival time $t_{a2}$. These arrival times are sent to the data acquisition and analysis system 58 via the pulser/receiver 54. The data acquisition and analysis system 58 calculates the ultrasonic time-of-flight through the first gap 34 as $\Delta t_a = t_{a2} - t_{a1}$.

The second ultrasonic transducer 48 operates in a similar pulse-echo mode at the same time. That is, the second ultrasonic transducer 48 mounted in the second tool 28 generates an ultrasonic wave that propagates through the acoustic couplant 52 and into the tool material. Part of the ultrasonic wave transmitted through the second tool 28 is reflected by the interface between the second cutting surface 32 and the electrolytic fluid 38. The reflected portion of the wave returns to the second transducer 48 (now functioning as a receiver) with an arrival time $t_{b1}$, while the other part of the ultrasonic wave is transmitted through the electrolytic fluid 38. This portion of the wave is reflected by the interface between the workpiece convex side 20 and the electrolytic fluid 38 and returns to the transducer 48 with an arrival time $t_{b2}$. These arrival times are sent to the data acquisition and analysis system 58 via the pulser/receiver 56. The data acquisition and analysis system 58 calculates the ultrasonic time-of-flight through the second gap 36 as $\Delta t_b = t_{b2} - t_{b1}$.

The gap sizes of the first and second gaps 34, 36, denoted as $W_a$ and $W_b$ respectively, are calculated by the data acquisition and analysis system 58 using the following equations:

$$W_a = (V_S \times \Delta t_a)/2$$

$$W_b = (V_S \times \Delta t_b)/2$$

where $V_S$ is the ultrasound velocity in the electrolytic fluid 38. The ultrasound velocity in the electrolytic fluid 38 can vary during electrochemical machining due to changes in the fluid density. However, because the density of the electrolytic fluid 38 typically reaches a constant value after a certain amount of machining time, the ultrasound velocity can be considered to be constant at this point. The ultrasound velocity can be calibrated using a known workpiece thickness or known gap size. An additional probe for updating the ultrasound velocity could be used as an alternative to using a constant velocity value.

Gas bubbles can be generated at the cutting surfaces of the first and second tools 26, 28 during electrochemical machining. In some instances, such gas bubbles can attenuate the ultrasonic waves and hinder the TOF measurements. Various measures optionally can be employed to counter this effect. For example, the TOF measurements can be made during a planned shut down of the DC power supply 40, such as the time interval used in pulsed electrochemical machining. Alternatively, the voltage DC power supply 40 may be reduced or regulated to minimize gas bubble generation. Insulation of the ultrasonic transducers 42, 48 may also be used.

The thickness of the workpiece 12 along the line of the transducer axis B can be determined from the measured gap sizes and the distance, D, between the first and second tools 26, 28. Specifically, the workpiece thickness, T, is given by:

$$T = D - W_a - W_b$$

where the distance D, which is determined from the data provided by the position sensors 27, 29, is fed to the data acquisition and analysis system 58 from the controller 33.

In the case of the rotor blade workpiece 12 illustrated in the Figures, the ECM tool assembly 10 machines the rotor blade's airfoil 16. As the airfoil 16 is being machined, the data acquisition and analysis system 58 can also detect the airfoil position relative to a workpiece datum (such as the shank portion 14). That is, during machining of the airfoil 16, the shank portion 14 is secured by a fixture (not shown) as is known in the art. By monitoring the position data from the position sensors 27, 29 relative the fixed position of the shank portion 14, the data acquisition and analysis system 58 can detect the position of the airfoil 16 relative to the shank portion 14. This means that the ECM tool assembly 10 will not only produce an rotor blade 12 with an airfoil 16 having the desired shape and dimensions, but will also ensure that the airfoil 16 is properly oriented with respect to the shank portion 14.

The gap sizes, workpiece thickness and airfoil position values calculated by the data acquisition and analysis system 58 are fed to the controller 33. The controller 33 uses these values in a feedback loop to control the advancement and feed rate of the first and second tools 26, 28.

The foregoing has described an approach for the in-situ measurement of gap size and workpiece thickness that is independent of workpiece material. Generally, the present invention is capable of resolving measurements of 0.1 millimeter. The applicable spatial resolution of the ultrasonic measurements can range from 1.0 to 20 millimeters or can have an even broader range depending on the type of transducers chosen and upon factors such as frequency, size, focal length, etc. Local information on the gap sizes and workpiece thickness can be obtained if focus-type transducers are used. The measured quantities reflect the averaged properties over the sensor surface areas if planar-type transducers are used.

While specific embodiments of the present invention have been described, it will be apparent to those skilled in the art that various modifications thereto can be made without departing from the spirit and scope of the invention as defined in the appended claims.

What is claimed is:
1. A method of monitoring machining in an electrochemical machining tool assembly having first and second tools arranged on opposite sides of a workpiece so as to define first and second gaps with said workpiece, said method comprising:
   mounting a first ultrasonic transducer in said first tool;
   mounting a second ultrasonic transducer in said second tool;
   generating ultrasonic waves with said first and second ultrasonic transducers;

detecting arrival times of reflections of said ultrasonic waves at said first and second ultrasonic transducers; and using said arrival times to calculate at least one of said first gap size, said second gap size, and thickness of said workpiece, wherein said first gap size is calculated multiplying said first gap ultrasonic time-of-flight by the ultrasound velocity in said first gap and dividing the resulting product by two.

2. The method of claim 1 wherein said step of detecting arrival times includes:
   detecting a first arrival time of an ultrasonic wave reflected from said first tool;
   detecting a second arrival time of an ultrasonic wave reflected from a first side of said workpiece;
   detecting a third arrival time of an ultrasonic wave reflected from said second tool; and
   detecting a fourth arrival time of an ultrasonic wave reflected from a second side of said workpiece.

3. The method of claim 2 wherein said step of using said arrival times to calculate at least one of said first gap size, said second gap size, and thickness of said workpiece includes calculating the ultrasonic time-of-flight in said first gap by subtracting said first arrival time from said second arrival time and calculating the ultrasonic time-of-flight in said second gap by subtracting said third arrival time from said fourth arrival time.

4. The method of claim 3 wherein said step of using said arrival times to calculate at least one of said first gap size, said second gap size, and thickness of said workpiece further includes calculating said second gap size by multiplying said second gap ultrasonic time-of-flight by the ultrasound velocity in said second gap and dividing the resulting product by two.

5. The method of claim 3 wherein said step of using said arrival times to calculate at least one of said first gap size, said second gap size, and thickness of said workpiece further includes:
   calculating said first gap size by multiplying said first gap ultrasonic time of-flight by the ultrasound velocity in said first gap and diving the resulting product by two;
   calculating said second gap size by multiplying said second gap ultrasonic time-of-flight by the ultrasound velocity in said second gap and dividing the resulting product by two; and
   calculating said workpiece thickness by subtracting said first gap size and said second gap size from the distance between said first and second tools.

6. The method of claim 1 further comprising detecting a position of a machined portion of said workpiece relative to a workpiece datum.

7. A method of monitoring machining in an electrochemical machining tool assembly having first and second tools, said method comprising:
   mounting a first ultrasonic transducer in said first tool;
   mounting a second ultrasonic transducer in said second tool;
   situating a workpiece between said first and second tools so as to define a first gap between said first tool and said workpiece and a second gap between said second tool and said workpiece;
   connecting a source of electric power to said first and second tools and to said workpiece;
   flowing an electrolytic fluid through said first and second gaps;
   generating ultrasonic waves with said first and second ultrasonic transducers;
   detecting a first arrival time of an ultrasonic wave reflected from an interlace between said electrolytic fluid and said first tool;
   detecting a second arrival time of an ultrasonic wave reflected from an interlace between said electrolytic fluid and a first side of said workpiece;
   detecting a third arrival time of an ultrasonic wave reflected from an interlace between said electrolytic fluid and said second tool;
   detecting a fourth arrival time of an ultrasonic wave reflected from an interlace between said electrolytic fluid and a second side of said workpiece; and
   using said arrival times to calculate at least one of said first gap size, said second gap size, and thickness of said workpiece,
wherein said step of using said arrival times to calculate at least one of said gap size, said second gap size, and thickness of said workpiece includes calculating the ultrasonic time-of-flight in said first gap by subtracting said first arrival time from said second arrival time and calculating the ultrasonic time-of-flight in said second gap by subtracting said third arrival time from said fourth arrival time.

8. The method of claim 7 wherein said step of using said arrival times to calculate at least one of said first gap size, said second gap size, and thickness of said workpiece further includes calculating said first gap size by multiplying said first gap ultrasonic time-of-flight by the ultrasound velocity in said first gap and dividing the resulting product by two.

9. The method of claim 7 wherein said step of using said arrival times to calculate at least one of said gap size, said second gap size, and thickness of said workpiece further includes calculating said second gap size by multiplying said second gap ultrasonic time-of-flight by the ultrasound velocity in said second gap and dividing the resulting product by two.

10. The method of claim 7 wherein said step of using said arrival times to calculate at least one of said gap size, said second gap size, and thickness of said workpiece further includes:
   calculating said first gap size by multiplying said first gap ultrasonic time-of-flight by the ultrasound velocity in said first gap and dividing the resulting product by two;
   calculating said second gap size by multiplying said second gap ultrasonic time-of-flight by the ultrasound velocity in said second gap and dividing the resulting product by two; and
   calculating said workpiece thickness by subtracting said first gap size and said second gap size from the distance between said first and second tools.

11. The method of claim 7 further comprising applying an acoustic couplant between said first ultrasonic transducer and said first tool and applying an acoustic couplant between said second ultrasonic transducer and said second tool.

12. The method of claim 7 further comprising detecting a position of a machined portion of said workpiece relative to a workpiece datum.

13. The method of claim 7 wherein said first and second ultrasonic transducers comprise contact transducers.

14. The method of claim 7 wherein said first and second ultrasonic transducers comprise immersion transducers.

15. A method of monitoring machining in an electrochemical machining tool assembly having first and second tools, said method comprising:
   mounting a first ultrasonic transducer in said first tool;
   mounting a second ultrasonic transducer in said second tool;

situating a workpiece between said first and second tools so as to define a first gap between said first tool and said workpiece and a second gap between said second tool and said workpiece;

connecting a source of electric power to said first and second tools and to said workpiece;

flowing an electrolytic fluid through said first and second gaps;

generating ultrasonic waves with said first and second ultrasonic transducers;

detecting a first arrival time of an ultrasonic wave reflected from an interlace between said electrolytic fluid and said first tool;

detecting a second arrival time of an ultrasonic wave reflected from an interlace between said electrolytic fluid and a first side of said workpiece;

detecting a third arrival time of an ultrasonic wave reflected from an interface between said electrolytic fluid and said second tool;

detecting a fourth arrival time of an ultrasonic wave reflected from an interlace between said electrolytic fluid and a second side of said workpiece;

using said arrival times to calculate at least one of said first gap size, said second gap size, and thickness of said workpiece; and disconnecting said source of electric power while generating ultrasonic waves with said first and second ultrasonic transducers and detecting said arrival times.

16. A method of monitoring machining in an electrochemical machining tool assembly having first and second tools, said method comprising:

mounting a first ultrasonic transducer in said first tool;

mounting a second ultrasonic transducer in said second tool;

situating a workpiece between said first and second tools so as to define a first gap between said first tool and said workpiece and a second gap between said second tool and said workpiece;

connecting a source of electric power to said first and second tools and to said workpiece;

flowing an electrolytic fluid through said first and second gaps;

generating ultrasonic waves with said first and second ultrasonic transducers;

detecting a first arrival time of an ultrasonic wave reflected from an interlace between said electrolytic fluid and said first tool;

detecting a second arrival time of an ultrasonic wave reflected from an interlace between said electrolytic fluid and a first side of said workpiece;

detecting a third arrival time of an ultrasonic wave reflected from an interface between said electrolytic fluid and said second tool;

detecting a fourth arrival time of an ultrasonic wave reflected from an interlace between said electrolytic fluid and a second side of said workpiece;

using said arrival times to calculate at least one of said first gap size, said second gap size, and thickness of said workpiece; and regulating said source of electric power to minimize gas bubble generation on said first and second tools.

* * * * *